(12) United States Patent
Chen et al.

(10) Patent No.: US 11,282,176 B2
(45) Date of Patent: Mar. 22, 2022

(54) IMAGE REFOCUSING

(71) Applicant: INTEL CORPORATION, Santa Clara, CA (US)

(72) Inventors: Shifeng Chen, Shanghai (CN); Yong Jiang, Shanghai (CN); Danyu Bi, Shanghai (CN)

(73) Assignee: Intel Corporation, Santa Clara, CA (US)

(*) Notice: Subject to any disclaimer, the term of this patent is extended or adjusted under 35 U.S.C. 154(b) by 340 days.

(21) Appl. No.: 16/469,272

(22) PCT Filed: Jan. 12, 2017

(86) PCT No.: PCT/CN2017/070972
§ 371 (c)(1),
(2) Date: Jun. 13, 2019

(87) PCT Pub. No.: WO2018/129692
PCT Pub. Date: Jul. 19, 2018

(65) Prior Publication Data
US 2019/0355101 A1    Nov. 21, 2019

(51) Int. Cl.
*G06K 9/40* (2006.01)
*G06T 5/00* (2006.01)
(Continued)

(52) U.S. Cl.
CPC ............... *G06T 5/003* (2013.01); *G06T 5/20* (2013.01); *G06T 7/11* (2017.01);
(Continued)

(58) Field of Classification Search
CPC ............ G06T 5/00; G06T 5/003; G06T 5/20; G06T 7/10; G06T 7/11; G06T 7/13; G06T 7/50;
(Continued)

(56) References Cited

U.S. PATENT DOCUMENTS 7,499,600 B2 * 3/2009 Ojanen ................... G06T 5/003
382/255
8,249,357 B2 * 8/2012 Yitzhaky ................. G06T 5/003
382/275
(Continued)

FOREIGN PATENT DOCUMENTS

WO    2005119592 A1    12/2005
WO    2012172817 A1    12/2012

OTHER PUBLICATIONS

Yosuke Bando, Tomoyuki Nishita, "Towards Digital Refocusing from a Single Photograph", IEEE, 15th Pacific Conference on Computer Graphics and Applications, 2007, pp. 363-372 (Year: 2007).*

(Continued)

*Primary Examiner* — Eric Rush
(74) *Attorney, Agent, or Firm* — Hanley, Flight & Zimmerman, LLC

(57) ABSTRACT

A system and method for refocusing an image including determining a point spread function (PSF) according to region of interest (ROI) and pixel depth, and converting the PSF to a gradient domain including differentiating the PSF to reduce nonzero elements in the PSF. The technique spreads intensity of pixels into a circle of confusion per the differentiated PSF. A shape of an optical system or aperture of the imaging device may be considered.

25 Claims, 17 Drawing Sheets

(51) Int. Cl.
*G06T 7/11* (2017.01)
*H04N 5/232* (2006.01)
*G06T 5/20* (2006.01)
*H04N 5/357* (2011.01)

(52) U.S. Cl.
CPC ............... *H04N 5/232121* (2018.08); *H04N 5/232127* (2018.08); *H04N 5/35721* (2018.08); *G06T 2207/10148* (2013.01)

(58) Field of Classification Search
CPC .............. G06T 7/80; G06T 2207/10004; G06T 2207/10052; G06T 2207/10148; H04N 5/23212; H04N 5/232121; H04N 5/232123; H04N 5/232125; H04N 5/232127; H04N 5/23229; H04N 5/3572; H04N 5/35721; G02B 7/28; G02B 7/36; G02B 27/0075
USPC ....... 382/254, 255, 260, 263, 264, 266, 276, 382/277, 279, 282; 396/79, 80, 89, 91, 396/139; 348/252, 345, 349, 575, 576, 348/578, 625; 356/4.01, 4.03, 4.04, 124.5
See application file for complete search history.

(56) References Cited

U.S. PATENT DOCUMENTS

| | | | |
|---|---|---|---|
| 8,422,827 B2* | 4/2013 | Ishii | ........................ G06T 5/003 382/299 |
| 8,824,821 B2 | 9/2014 | Ali et al. | |
| 9,124,797 B2* | 9/2015 | Guenter | ............. H04N 5/35721 |
| 9,262,815 B2* | 2/2016 | Tezaur | .................... G06T 5/003 |
| 9,652,833 B2* | 5/2017 | McCloskey | ............. G06T 5/003 |
| 2011/0199492 A1 | 8/2011 | Kauker et al. | |
| 2013/0336597 A1* | 12/2013 | Maeda | .................... G06T 5/003 382/275 |
| 2015/0348239 A1 | 12/2015 | Nestares et al. | |
| 2017/0076430 A1* | 3/2017 | Xu | .......................... G06T 5/003 |

OTHER PUBLICATIONS

International Search Report for Related PCT Application PCT/CN2017/070972 with a completion date of Sep. 30, 2017 and dated of Oct. 17, 2017; 2 pages.

Point Grey, "ProFUSION 25, 5X5 Digital Camera Array," eu-sales@ptgrey.com www.ptgrey.com, 1 page. 2020.

Vaish et al., "Synthetic Aperture Focusing using a Shear-Warp Factorization of the Viewing Transform," 2005 IEEE Computer Society Conference on Computer Vision and Pattern Recognition, Sep. 21-23, 2005, 8 pages.

Vision System Design," Sharply Focused Novel lenses and optics make light-field cameras viable," retrieved from https://www.vision-systems.com/non-factory/life-sciences/article/16739274/sharply-focused, Mar. 1, 2008, 13 pages.

International Searching Authority, "International Preliminary Report on Patentability," issued in connection with PCT patent application No. PCT/CN2017/070972, dated Jul. 16, 2019, 4 pages.

\* cited by examiner

200

500

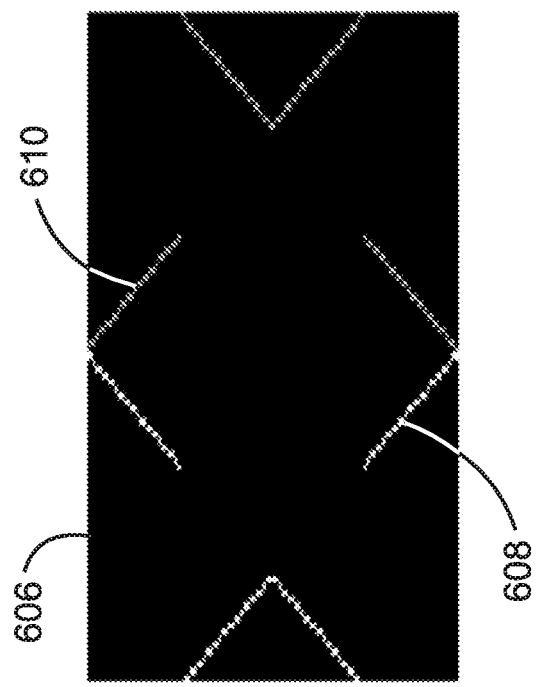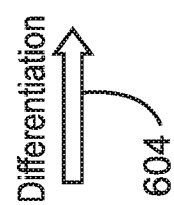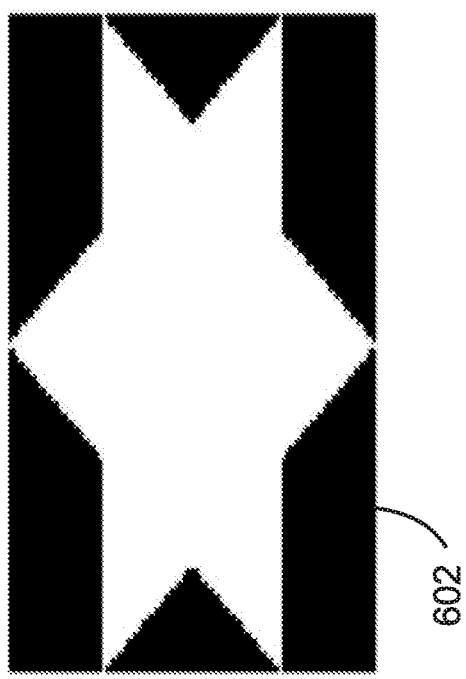
FIG. 6
600

700

1100

1300

1400

1600

1700

IMAGE REFOCUSING

CROSS REFERENCE TO RELATED APPLICATIONS

Pursuant to 35 U.S.C. § 371, this application is the United States National Stage Application of International Patent Application No. PCT/CN2017/070972, filed on Jan. 12, 2017, the contents of which are incorporated by reference as if set forth in their entirety herein.

TECHNICAL FIELD

The present techniques relate generally to refocusing of an image captured by an imaging system and, more particularly, to the refocusing via a point spread function (PSF) and differentiation.

BACKGROUND

An imaging device such as a camera captures an image. The image may be in focus or out-of-focus. A portion of the image may be in focus and another portion of the image may be out-of-focus. A region of interest (ROI) may specify an area of the image to be in focus.

Users may generally desire high-quality images, as well as ease-of-operation of a camera or camera array and associated imaging processing. Responsiveness with respect to camera features may include flexibility and speed. As technology advances and competition increases, the continuous improvement of camera capability and image processing is generally beneficial.

BRIEF DESCRIPTION OF THE DRAWINGS

FIG. 6 is a diagram showing a PSF for an aperture having a hexagram shape that is continuous with respect to differentiation), the PSF subjected to differentiation to give a sparser PSF in accordance with embodiments of the present techniques.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
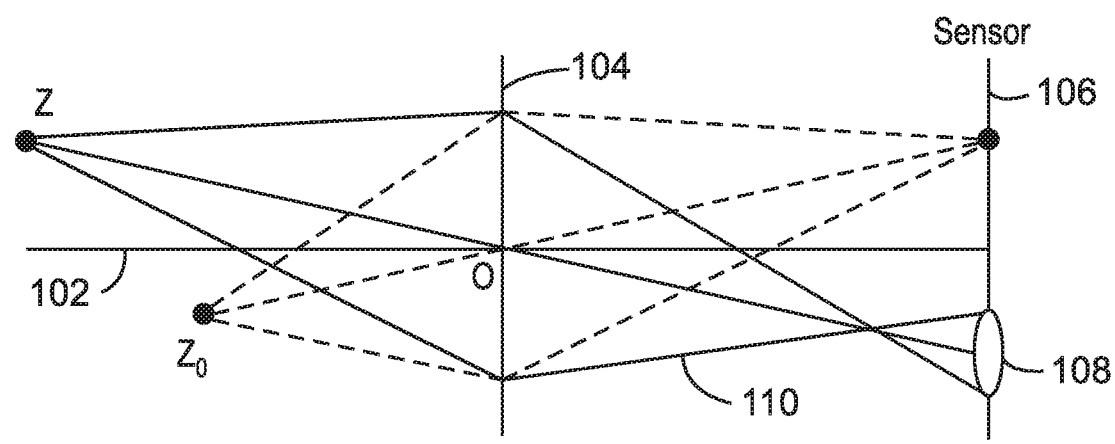
FIG. 1 is a drawing of a projection depiction showing a principle of refocusing in accordance with embodiments of the present techniques.

The present techniques are directed to refocusing and which may include relatively fast and high-quality refocusing in real time, as well as refocusing in image processing after the image has been captured. Embodiments may involve imaging systems or imaging devices such as cameras, camera arrays, ultrasonic imaging systems, and so forth. Further, examples may apply to three dimensional (3D) rendering for virtual reality (VR), camera apps, video conference applications, and so on.

The techniques may refocus an image captured by an imaging device, including determining a point spread function (PSF) according to pixel depth and a region of interest (ROI). Also, in certain embodiments, the shape of the optical system (e.g., aperture, mask, lens aperture, or other optical device) of the imaging system may be considered. Moreover, embodiments may convert the PSF to a gradient domain including differentiating the PSF to reduce nonzero elements in the PSF to give a sparser PSF (e.g., sparser in nonzero elements).

In some embodiments, the PSF may be differentiated by row or by column, or by both for multi-order differentiation. Indeed, the gradient domain may be a multi-order gradient domain. The technique may generally spread out intensity of pixels of the imaging device into a circle of confusion per the sparser PSF. The spreading out of intensity of the pixels may incorporate a spread diameter correlative with distance between depth of a pixel and a depth of refocusing.

The image may be produced as refocused toward the ROI. The image may also be in focus in other region(s) that share depth with the ROI. Moreover, as discussed below, certain embodiments may benefit with at least a portion of an aperture having a continuous shape with respect to the differentiation.

The spreading out of intensity of the pixels may involve applying the sparser PSF respectively to each input pixel. Further, the technique may include subsequently integrating the spreading of the intensity of the pixels per the sparser PSF. In some examples, the differentiating and integrating may be performed in real time without image quality loss.

A PSF generally may be describe as the response of an imaging system to a point source or point object. The degree of spreading (blurring) of the point object may be a measure for the quality of an imaging system.

Gradient-domain image processing may be a type of digital image processing that operates on the differences between neighboring pixels, rather than on the pixel values directly. Mathematically, an image gradient may represent the derivative of an image, so the goal of gradient domain processing may be to construct a new image by integrating the gradient.

A circle of confusion may be the part of an image that is acceptably sharp, and may determine the depth of field. A circle of confusion may be dependent on image format, visual acuity, viewing conditions, and the amount of enlargement, and so forth. The diameter of a circle of confusion for the final image may be defined as the largest blur spot that will still be perceived by the human eye as a point. Moreover, defocused object points may be imaged as blur spots rather than points. Such a blur spot may have the same shape as the camera aperture, but for simplicity, may be treated as circular. Again, a common criterion for "acceptable sharpness" in the final image (e.g., print, projection screen, or electronic display) is that the blur spot be indistinguishable from a point.

Refocusing may be a technique to simulate a shallow depth of field. Refocusing to a particular depth may involve selecting a ROI. Then, spreading out intensity of each pixel into the circle of confusion corresponding to pixel depth as well as per the aperture shape in some cases, and producing an image that is in focus in regions sharing the depth of the ROI. The resulting refocused image may be the integration of the circles (or aperture shape) from most or all input pixels. Some embodiments may also provide for refocusing to multiple depths or ROIs at different depths.

FIGS. 1-4 show a principle of refocusing to a particular depth. FIG. 1 is a projection depiction 100. The depiction 100 includes a Z-axis 102 (distance), lens line 104, and an optical center O, where Z is distance and $Z_0$ is depth of the focus plane. Also included are a sensor line 106, circle of confusion 108, and depth projection lines 110.

Figure 2:
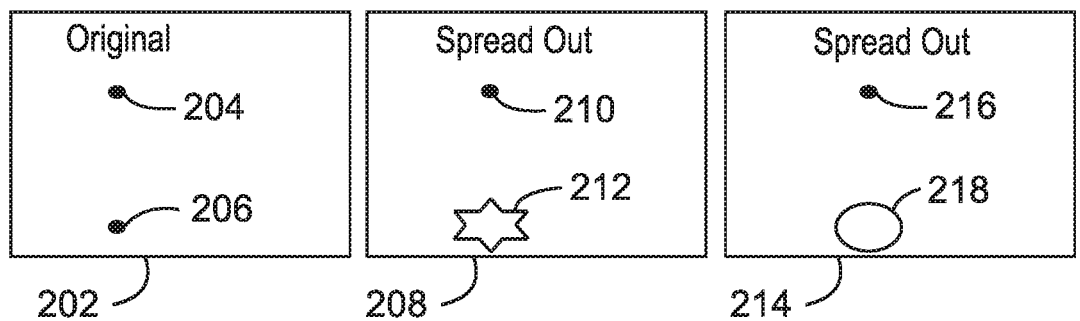
FIG. 2 is representation diagrams showing a principle of refocusing in accordance with embodiments of the present techniques.

FIG. 2 is representation diagrams 200 analogous to the depiction 100 in FIG. 1. The diagram 202 is a captured all-in-focus image having a point with distance d0 at 204 and a point with distance d1 at 206. The intensity of pixels is not spread out in diagram 202. The diagram 208 is a refocused image of diagram 202 having a processed point with distance d0 at 210 and a processed point with distance d1 at 212. In diagram 208, the intensity of pixels is spread out into the hexagram shape of the aperture and with d1 not the same as d0. The diagram 214 is another refocused image of diagram 202 having processed point with distance d0 at 216 and a processed point with distance d1 at 218.

Thus, in diagrams 208 and 214, the intensity of pixels is spread out into the shape of the aperture. In the illustrated example of FIG. 2, two kinds of aperture are shown. One aperture is hexagram shape and the other aperture is a circle shape. Additional aperture shapes, such a rectangle shape or heart shapes, or additional shapes, may be applicable.

Again, the focus plane depth is $Z_0$ and input pixels are assumed to be in focus shown in the original plane. Then, intensity of each pixel is spread out into the circle of confusion and the spread diameter related to the $|Z-Z_0|$ or $|d-d_0|$, where $d_0$ is the depth of refocusing and $|Z-Z_0|$ is directly proportional to $|d-d_0|$. The resulting refocused image may be the integration of the aperture shape from most or all input pixels.

Figure 3:
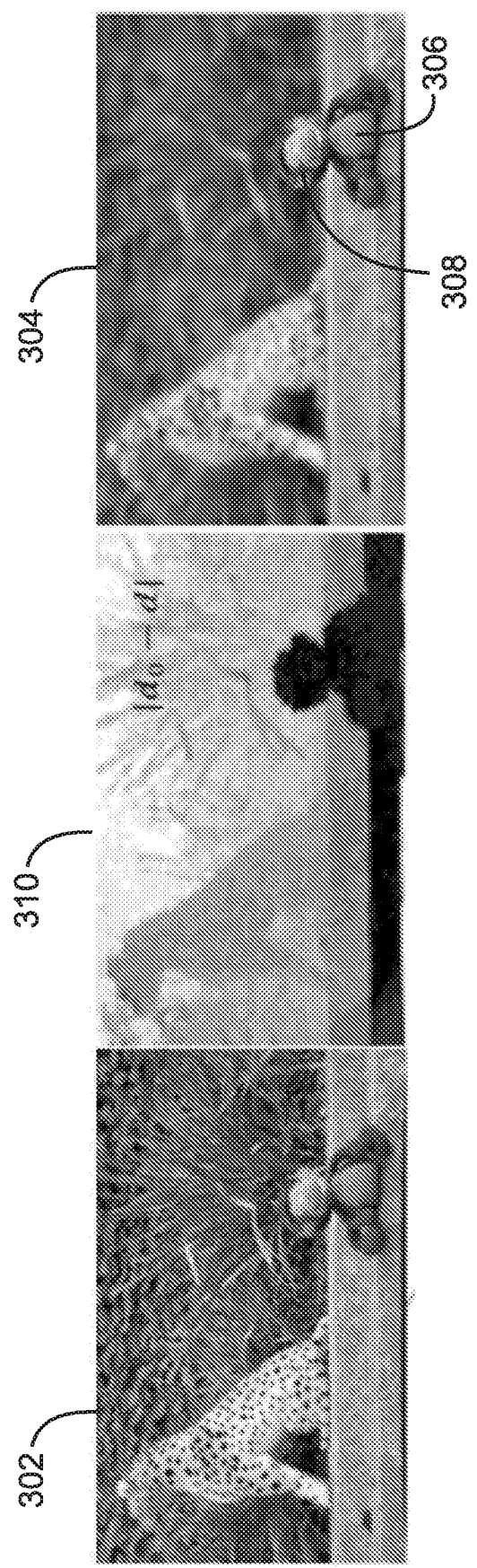
FIG. 3 is images to illustrate differentiation and application of a point spread function (PSF) in accordance with embodiments of the present techniques.

FIG. 3 is images 300 to illustrate application of a PSF and differentiation. In particular, the image 302 is an original generally in focus and with no focusing ROI, and no spread of pixel intensity. Conversely, the image 304 has an ROI 306 on the monkey 308. Pixel intensity may spread into the circle of confusion around the ROI 306. The depth image 310 or depth difference image is captured or is a calculated image of depth information of each pixel in 302. With respect to the depth image 310, the distances of objects may be measured, the distances between objects may be known, the focal plane may be selected, and the PSF may be defined.

Figure 4:
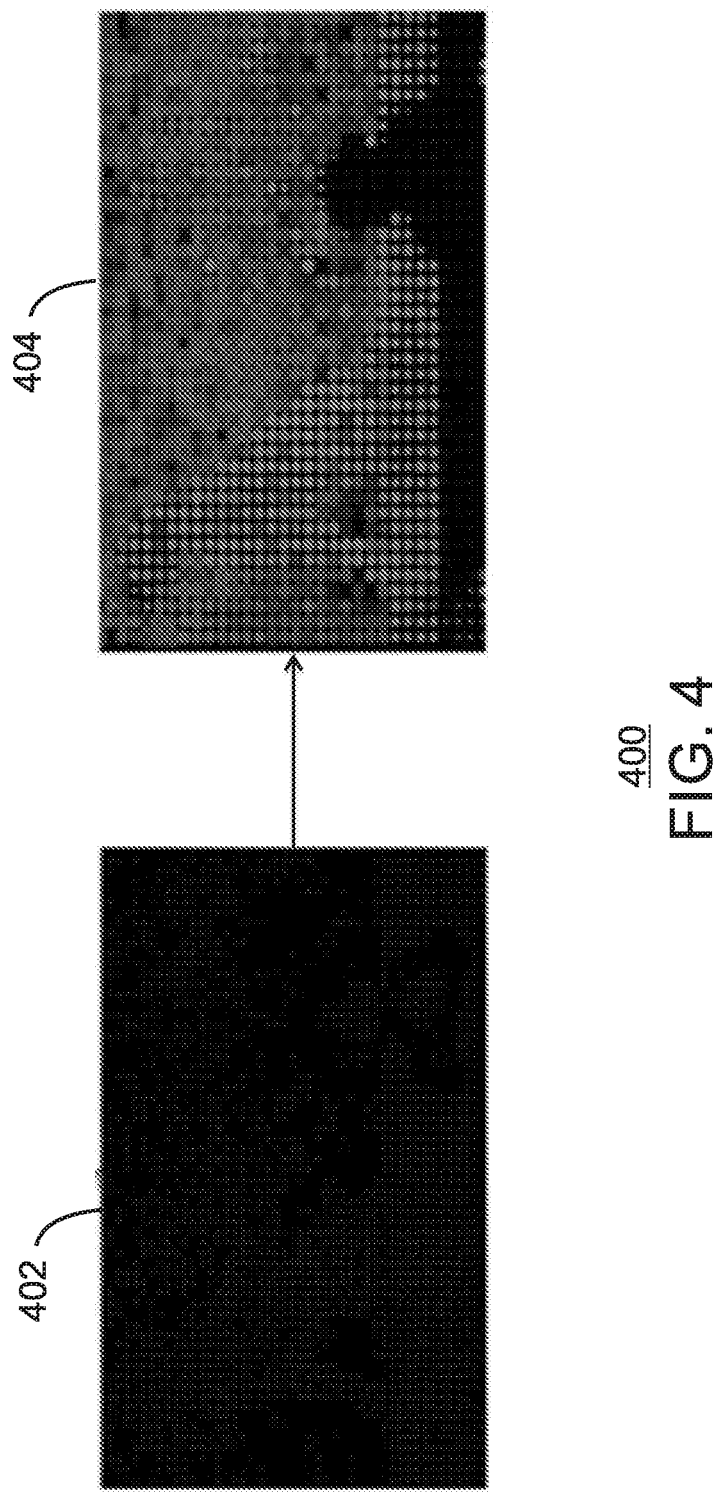
FIG. 4 is images including a subsample and showing a principle of refocusing in accordance with embodiments of the present techniques.

FIG. 4 is images 400 including an image 402 that is a subsample of the original image 302 to facilitate visualization. The image 404 is analogous to the spread image 304 of FIG. 3 and depicting spread-out circles or splattering.

With technology, such as real sense camera, 3D rendering cases including virtual reality (VR), and the like, techniques or software may not only accommodate red-green-blue (RGB) data but also the depth of each pixel. Therefore, the image may be refocused to a particular depth. In some instances, the refocusing may be relatively slow or result in image quality loss. Directly computing may give a high-quality image but can be slow including with a higher resolution image or a big depth range, as directly computing generally requires multiple updates per pixel. Other approaches may be faster but sacrifice image quality. For instance, an accelerating method using simulated space-variant filter based on the Laplacian Pyramid may give a faster determination but image quality typically suffers. That accelerating approach may enhance the appearance of the refocused images generated with basic refocusing, but can be limited, for instance, to radially symmetric frequency responses and have image quality loss which may not meet the demand for high-quality images.

Conversely, certain embodiments herein employ differentiation and integration in refocusing for real-time implementation with little or no image quality loss. For a given aperture, each pixel may be converted to a shape by a point spread function (PSF). The PSF may be a function f (x, y, d, a) in the refocusing, where (x, y) is the position of each pixel in the image, d is the depth of each pixel, and a is the aperture shape. The efficiency of refocusing may be linear to a combination of PSFs for most or all of the pixels. In some examples, computation time for each pixel may be linear to the number of nonzero elements in the respective pixel PSF. Thus, reducing nonzero elements in the PSF may accelerate refocus. Typically, a PSF contains elements with same quantity. For instance, the PSF associated with a disc (or edge of disc or circle) may have most or all elements of 1 where 1 is weight. Some examples may make the PSF sparser by converting the PSF to a gradient domain (e.g., multiple order), as indicated in FIG. 5.

Figure 5:
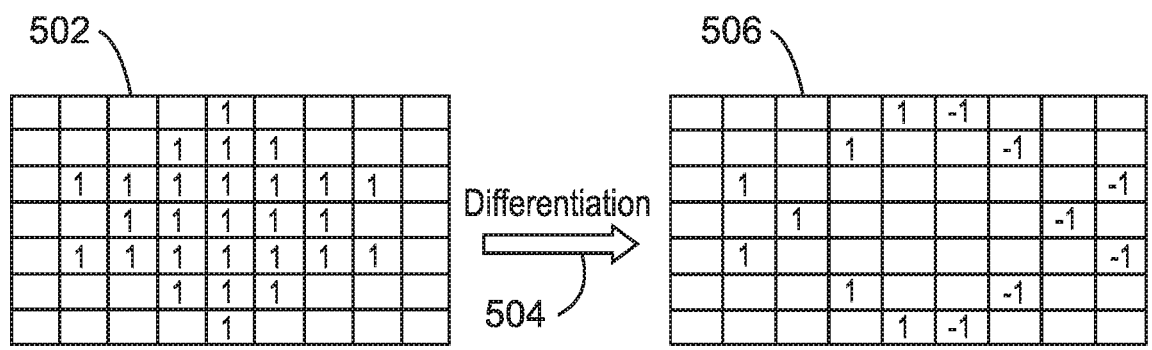
FIG. 5 is a diagram depicting making a PSF sparser in accordance with embodiments of the present techniques.

FIG. 5 is a diagram 500 depicting making a PSF sparser. In particular, the PSF 502 (a visual representation of a PSF in the illustration) is subjected to differentiation 504 to give a sparser PSF 506. In the illustrated example, the differentiation 504 is horizontal differentiation, or in other words, in the x-direction or by row. The differentiation may also be vertical, by column, in the y-direction, or in other directions such as diagonal, and so forth. The differentiation may be multi-directional such by both row and column.

In this example, the PSF 502 is for an aperture shape of a hexagram and all nonzero elements are 1. The blank squares in the diagrams of the PSF 502 and PSF 506 are zero. Again, the "1" may be weight. For example, if the value of original pixel is 200, and the spread to twenty-seven pixels equally as there are twenty-seven 1's in the PSF 502, and each pixel's value will be 200/27.

Moreover, to apply the horizontal differentiation 504 to the PSF 502, adjacent elements or squares (cells) may be subtracted. For example, in a row, a cell may subtract a value from a cell immediately to the left. For vertical differentiation, in a column, a cell may subtract a value from the cell immediately below.

In certain examples, multi-order differentiation may be applied (e.g., repeatedly) to the PSF to make the PSF sparser and until the PSF becomes the sparsest. Then, the combination of PSFs as applied each pixel may be performed based on the sparsest PSF 506 in the gradient domain. Lastly, integration(s) may be conducted accordingly to output the result image corresponding to the differentiation order number. Because the non-zero elements may be reduced (e.g., greatly reduced), speed improves and in some instances significantly. In a particular example test, a 32× speed improvement was realized as compared to direct computing of the refocusing. Moreover, for at least the reason this PSF technique may avoid skipping potential pixel updates, there may be little or no quality loss in contrast to the simulated space-variant filter approach where speed may be comparable.

Compared with directly computing, examples of the present techniques may be more efficient and faster including with various aperture shapes and large resolution images. In addition, image quality may be generally maintained. For the refocusing scene indicated by FIG. 3, a PSF example herein for refocusing a hexagram aperture to the image to ROI 306, this example is 32 times faster than directly computing and nearly as fast as a space-variant filter but did not have quality loss. The conditions were: environment of processor I7-4790, 3.6 GHz, 4 core 8 thread; image size of 1288*968 pixels; and aperture size of 20*20 pixels. Results for this hexagram aperture example are given in Table 1 below.

TABLE 1

Runtime Comparison

| Method for refocusing | Computation Time (ms) | Quality Loss |
| --- | --- | --- |
| Differentiation | 50 | No |
| Directly computing | 1600 | No |
| Simulated Space-variant Filter | 40 | Yes |

As mentioned, FIG. 5 depicts a principle of differentiation for refocus and shows a principle of converting a PSF into a gradient domain. For an aperture of a hexagram shape as an example, the area with 1 in the PSF 502 on the left is the discrete data of aperture while the 1 in the gradient domain is shown in the PSF 506 on the right. An area with 1 or −1 may be involved in combination of the PSF. As can be seen in FIG. 5 when using differentiation, if the aperture shape is continuously in a row or column (e.g., along the direction(s) of differentiation), the calculation of PSF combination may be largely reduced giving speed improvement compared to directly computing.

FIG. 6 is a diagram 600 showing a PSF 602 for an aperture having a hexagram shape which may be continuous in the direction of differentiation. Differentiation 604 applied to the PSF 602 gives the resulting PSF 606 with the white area 608 as 1 and the gray area 610 as −1. As represented, the calculation for the resulting PSF 606 is significantly reduced as compared to the non-differentiated original PSF 602. Yet, if the aperture shape is not continuous but instead discrete in direction of differentiation, the calculation may not be reduced but instead, for example, doubled as indicated in FIG. 7.

Figure 7:
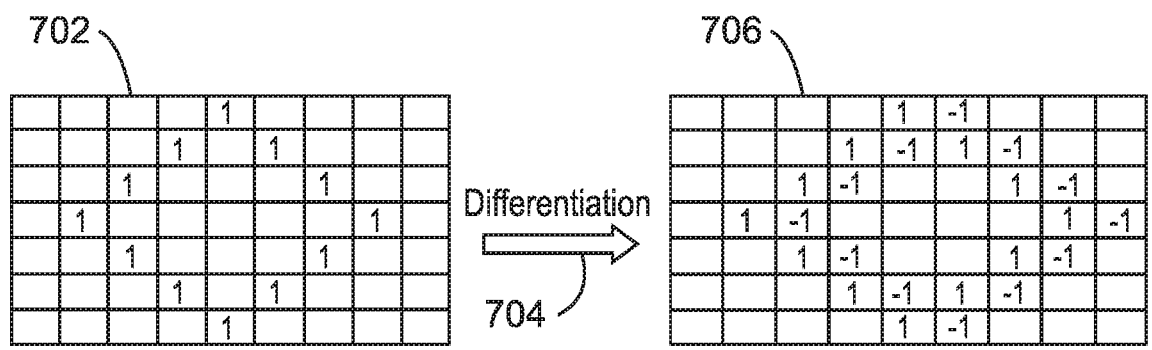
FIG. 7 is a diagram depicting differentiation of a PSF for an aperture having a shape that is discrete (non-continuous) with respect to differentiation.

FIG. 7 is a diagram 700 depicting applying horizontal differentiation 704 (x-direction) to a PSF 702 for an aperture having a discrete (non-continuous) shape in the direction of differentiation. Thus, the resulting PSF 706 is not sparser but is double, or twice as dense (half as sparse in nonzero elements). Therefore, embodiments may balance the adoption of differentiation for each point based on the aperture shape. More specifically, for each point, if the PSF is continuous either in x or y direction, differentiation may be adopted by row or by column based on the calculation. Otherwise for a discrete aperture shape, directly computing may be implemented. However, it should be noted that a differentiation in a diagonal direction for the PSF 702 may apply to continuous shape of the aperture.

When using differentiation, multi-order of differentiation may be applied until the PSF is significantly sparser which may significantly reduce the calculation of the PSF combination. The application of multi-order differentiation to the PSF until the PSF is the sparsest may give a maximum reduction in the calculation of the PSF combination.

Figure 8:
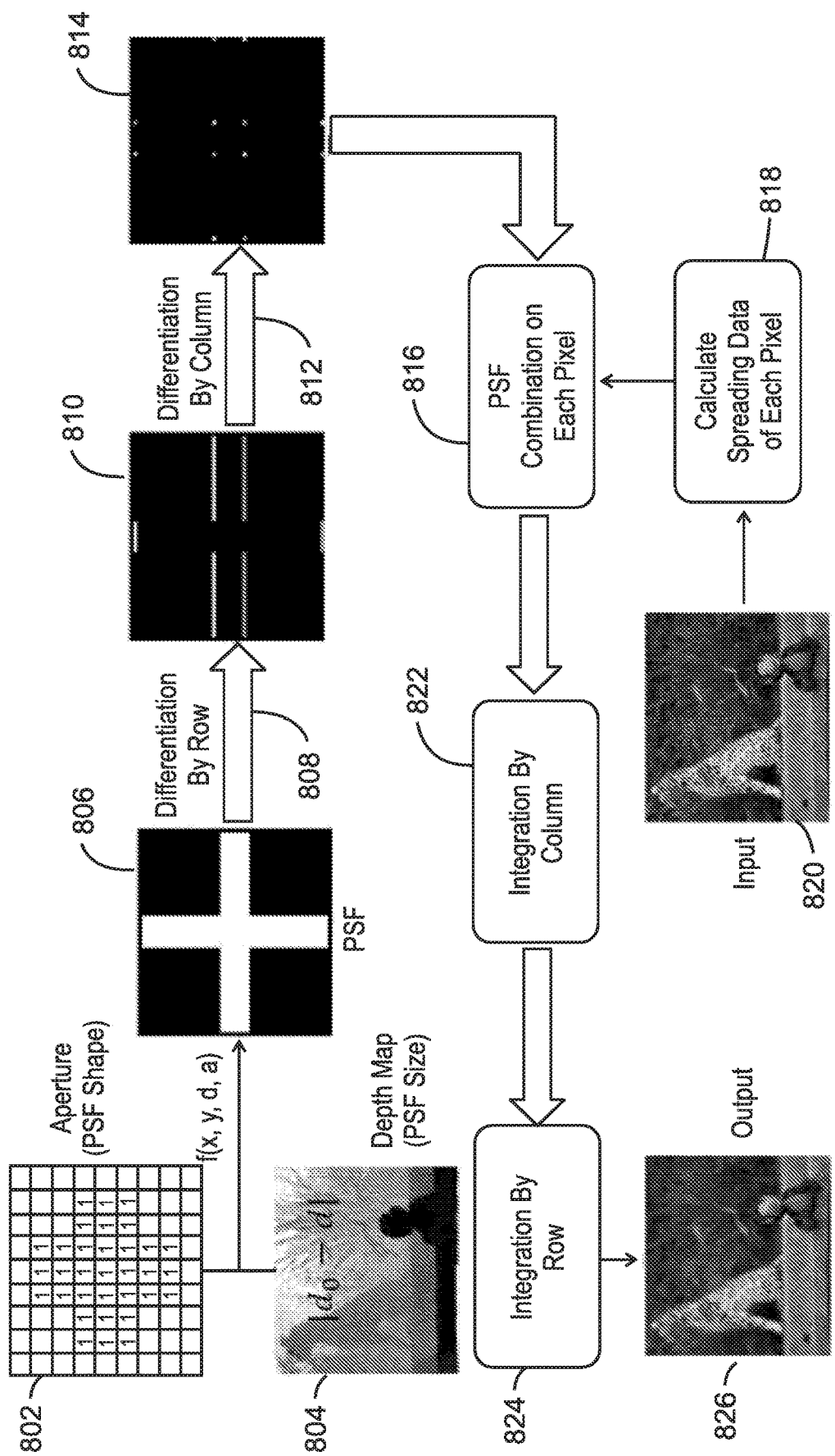
FIG. 8 is a diagram of a method of refocusing in accordance with embodiments of the present techniques.

Take the aperture shape PSF 802 in FIG. 8 as an example. The aperture is continuous in both the horizontal and vertical directions, and therefore differentiation is adopted. Application of two orders of differentiation to the generated PSF, one by row and the other by column, makes the PSF sparsest. After differentiation, the PSF combination may be conducted on each pixel to obtain the differentiated refocus image. A size of the PSF on each pixel may be calculated with the depth map. Lastly, two integrations with the directions related to the differentiation may be applied to the differentiated refocus image to obtain the final result (the refocused image). A refocus procedure is given in FIG. 8.

FIG. 8 is a method 800 of refocus, including employing differentiation and integration. A function f (x, y, d, a) is applied to an aperture (PSF shape) 802 and depth map (PSF size) 804 to give a PSF 806. Differentiation by row (arrow 808) is applied to the PSF 806 to give a sparser PSF 810. Differentiation by column (arrow 812) is applied to the PSF 810 to give an even sparser PSF 814. As indicated, the calculation associated with the sparsest PSF 814 is significantly less than the original PSF 808. Again, in this example, the aperture is continuous with respect to the direction of differentiation.

At block 816, the PSF is applied respectively on each pixel giving a PSF combination. To do so, at block 818, the method calculates spreading data of each pixel with the image 820 as input. At block 822, the method applies integration by column. At block 824, the method applies integration by row. The final image 826 as focused or refocused is output.

Figure 9:
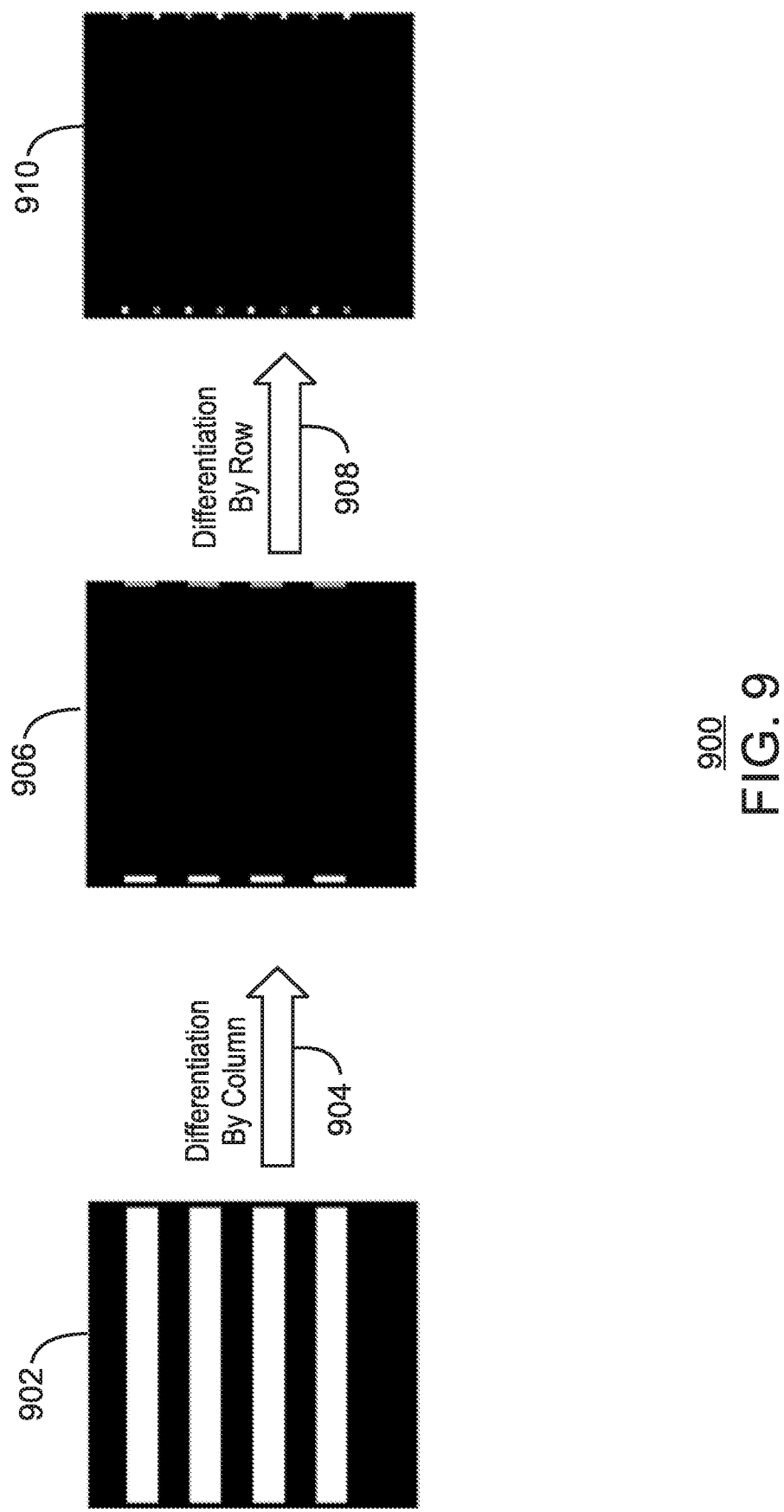
FIG. 9 is diagram of a PSF for an example aperture type and with differentiation applied in accordance with embodiments of the present techniques.

FIG. 9 is a diagram 900 of a PSF 902 for an example aperture type and with differentiation applied. Differentiation by column 904 is applied to give a sparser PSF 906. Also, differentiation by row 908 is applied to give an PSF 910 for that example aperture that is sparser than the sparser PSF 906.

Figure 10:
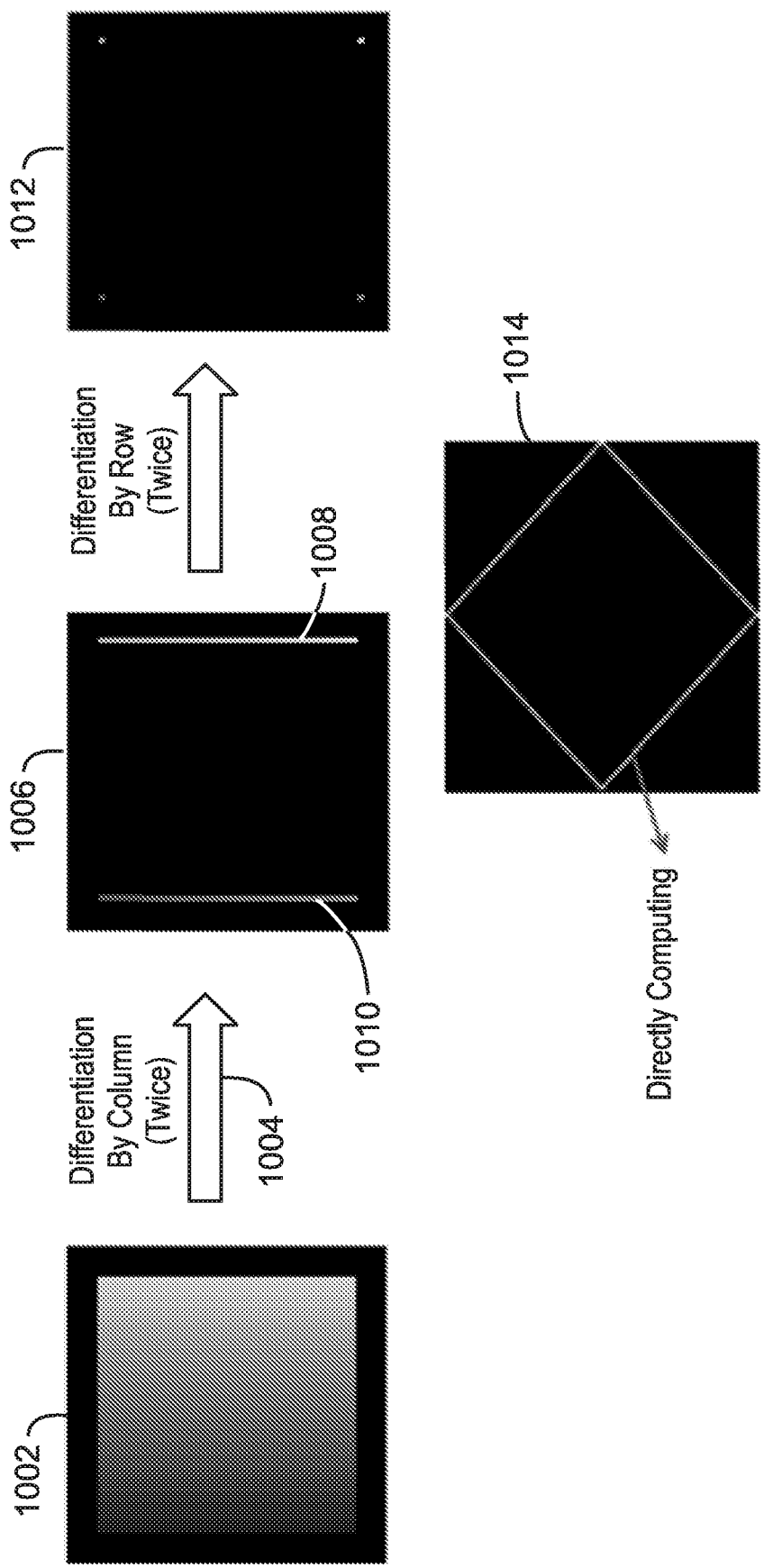
FIG. 10 is a diagram of a PSF for another example aperture type and with differentiation applied in accordance with embodiments of the present techniques.

FIG. 10 is a diagram 1000 of a PSF 1002 for another example aperture type and with differentiation applied. Differentiation is applied by column twice 1004 to the PSF 1002 to give a sparser PSF 1006 having nonzero elements only in the reduced areas 1008 and 1010. Differentiation by row twice 1011 is applied to the intermediate sparser PSF 1006 to give an even more sparser PSF 1012 having nonzero elements only in significantly-reduced areas in the four corner areas. For comparison, the PSF 1014 for directly computing is given and which has more nonzero elements and thus when applied requires more calculations.

Figure 11:
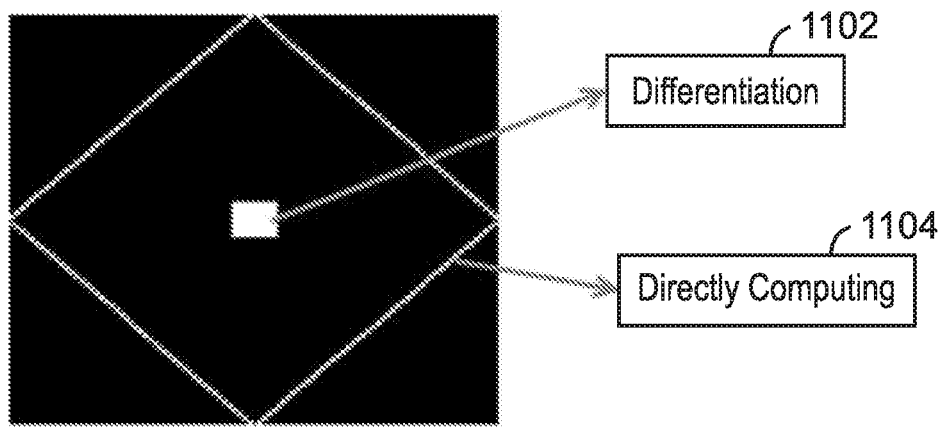
FIG. 11 is diagram of a PSF for an example aperture and in which two buffers are prepared to implement refocus in accordance with embodiments of the present techniques.

In addition, to accelerate the procedure employing differentiation, the differentiation can be applied specified to the valid pixel for the aperture. FIG. 11 is diagram 1100 of a PSF for an example aperture and in which two buffers are prepared to implement refocus. One buffer is for differentiation 1102 and the other buffer is for directly computing 1104. The center area is continuous and thus differentiation 1102 is selected, while the other area is non-continuous and thus directly computing 1104 is chosen.

After differentiation, integration is applied to the differentiation buffer and merge the two buffers to get the final refocusing image. The initial integration value may be identified. Moreover, because a large or maximum diameter may be obtained, the image boundary could be extended by half of the maximum diameter when implementing differentiation. A procedure for final refocusing is indicated in FIG. 12.

Figure 12:
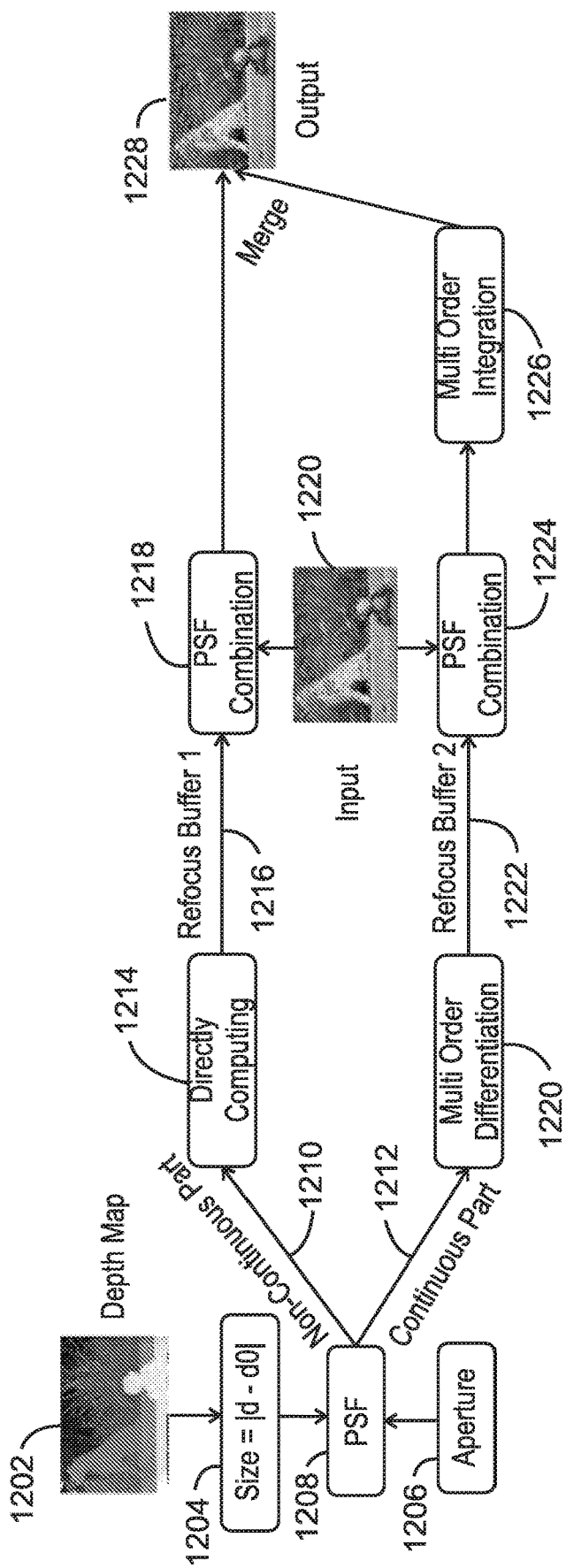
FIG. 12 is diagram of a method of refocusing in accordance with embodiments of the present techniques.

FIG. 12 is a method 1200 of refocusing. A depth map 1202 is input to block 1204 to determine size=$|d-d_0|$ as distance of depth d of a pixel or object to the focal plane $d_0$. The size along with the aperture 1206 shape or information determines the PSF 1208. At block 1214, directly computing is performed on a discrete or non-continuous portion 1210 of the PSF 1208. A refocus buffer-1 1216 receives the output. At block 1218, a PSF combination is applied for the pixels.

At block 1220, a continuous part 1212 of the PSF 1208 is subject to multi-order differentiation. A second refocus buffer-2 1222 receives the output. At block 1224, a PSF combination is applied for the pixels. At block 1226, multi-order integration is performed, and which is then combined with the PSF combination 1218 associated with the directly computing to give the refocused image 1228 as output.

Thus, the techniques may apply disparity or depth information to do refocusing. Moreover, an intermediate processing buffer may accommodate the image refocused in the gradient domain.

Refocusing is an image processing technology for photographers and becoming more beneficial in 3D rendering for VR. Embodiments speed refocusing by processing in the gradient domain with little or no quality loss in contrast to other accelerating options which experience quality loss. Also, certain embodiments run much faster than directly computing. Further, embodiments may facilitate to reduce memory and could be widely applied to different kinds of aperture shapes and sizes.

Figure 13:
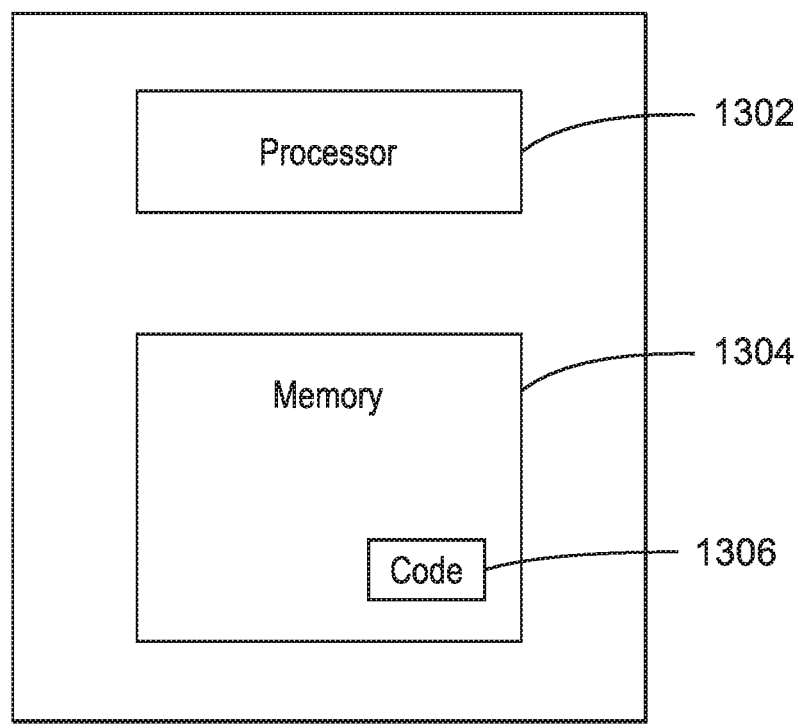
FIG. 13 is a diagram of a computing device for refocusing in accordance with embodiments of the present techniques.

FIG. 13 is a computing device 1300, such as a computing system, server, imaging device, camera, camera array, optical device, and the like. The computing device 1300 may be a stand-alone computing device or a component of a distributed computing system. While FIG. 13 depicts one computing device 1300, embodiments may employ multiple computing devices 1300. The computing device 1300 may be coupled to an imaging device or system. The computing device 1300 may interact with an imaging device to facilitate capture of a refocused image, or be directed to imaging processor post-capture of the image, and so forth.

The computing device 1300 includes a processor or hardware processor 1302 such as a microprocessor, a central processing unit or CPU, and so forth. The processor 1302 may be multiple processors or each processor 1302 may have multiple cores. The computing device 1300 has memory 1304, such as non-volatile memory, volatile memory, and other types of memory. The nonvolatile memory may be a hard drive, read-only-memory or ROM, etc. The volatile memory may be random access memory or RAM, cache, etc.

In the illustrated example, the memory 1304 stores code 1306, e.g., instructions, logic, etc., executable by the one or more processors 1302. The code 1306 may be labeled, for example, as a "refocusing manager". The code 1306 may be executed by the processor 1302 to implement the refocusing techniques discussed herein. Further, respective actions may be implemented by different computing devices 1300. Also, the computing device 1300 including the refocusing manager 1306 may incorporate an application-specific integrated circuit (ASIC) customized for the techniques described.

Figure 14:
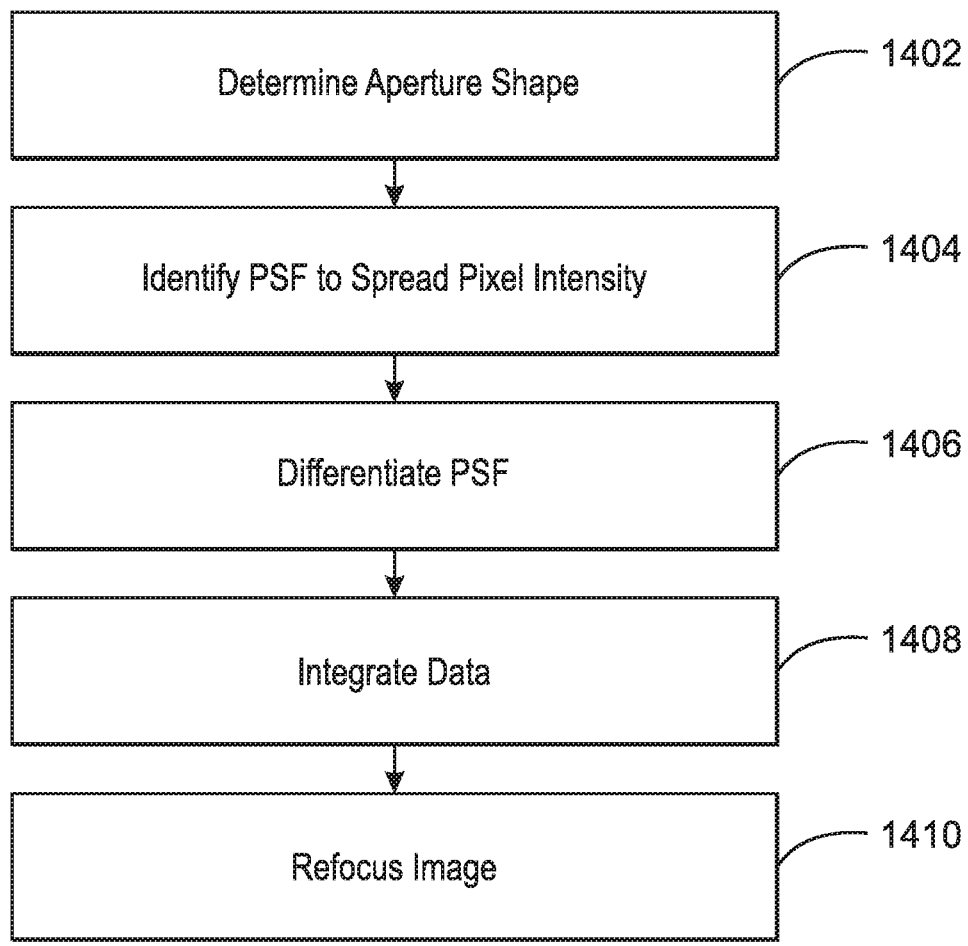
FIG. 14 is a block flow diagram of a method of refocusing in accordance with embodiments of the present techniques.

FIG. 14 is a method 1400 of focusing or refocusing an image captured by a camera having an aperture. At block 1402, a shape of an aperture is determined. A standard shape may be a circle. Other shapes are hexagrams, rectangles, hearts, and so forth. In this example, at least a portion of the aperture shape is continuous.

At block 1404, the method identifies or receives a PSF associated with the aperture shape and a selected ROI for the image. Some elements in the PSF may be nonzero (e.g., 1) and require additional calculation. Other elements in the PSF may be zero and thus generally do not require additional calculation.

At block 1406, the PSF may be differentiated (e.g., in the gradient domain), as discussed, to lower the number or amount of nonzero elements so to reduce subsequent calculations. The differentiation may be multi-order differentiation. The resulting sparser PSF (e.g., sparser in nonzero elements) may be applied respectively to each input pixel, and this sparser PSF combination as applied spreads pixel intensity into the circle confusion associated with the aperture shape and ROI. At block 1408, the data may be integrated, as discussed, to refocus the image, as indicated at block 1410. The order integration may match the order of differentiation.

Figure 15:
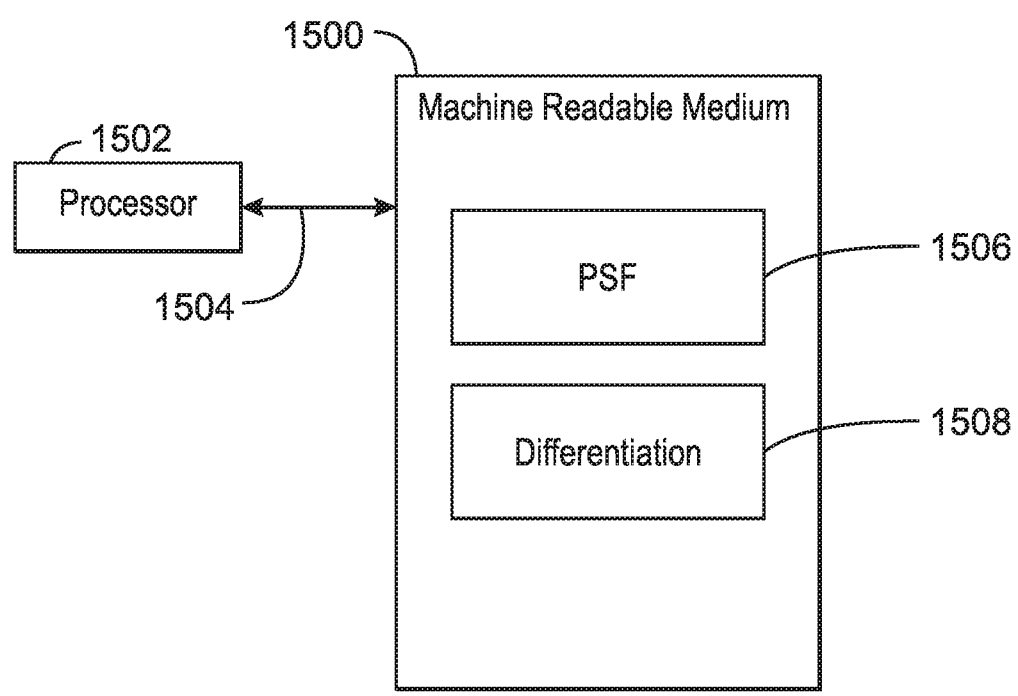
FIG. 15 is a block diagram illustrating a computer-readable medium to facilitate refocusing in accordance with embodiments of the present techniques.

FIG. 15 is a block diagram depicting a tangible, non-transitory, computer-readable medium 1500 to facilitate refocusing of an image captured by a camera. The computer-readable medium 1500 may be accessed by a processor 1502 over a computer interconnect 1504. The processor 1502 may be a server processor, a camera processor, a camera array processor, a sensor processor, a server processor, a remote computing device processor, or other processor. The tangible, non-transitory, computer-readable medium 1500 may include executable instructions or code to direct the 1502 to perform the operations of the techniques described herein, such as to implement gateway coordination.

The various software components discussed herein may be stored on the tangible, non-transitory, computer-readable medium 1500, as indicated in FIG. 15. For example, a PSF module 1506 (executable code/instructions) may direct the processor 1502 to identify a PSF associated with aperture shape, ROI, pixel depth, and so on. A differentiation module 1508 may direct the processor 1502 to differentiate the PSF to reduce nonzero elements. As discussed, the differentiation may be multi-order and in the gradient domain. Further the sparser PSF (with less nonzero elements) may be applied in combination to most or all input pixels to spread pixel intensity into the circle of confusion. As also discussed, integration may be performed to give the final refocused image. It should be understood that any number of additional software components not shown in FIG. 15 may be included within the tangible, non-transitory, computer-readable medium 1500, depending on the application.

Figure 16:
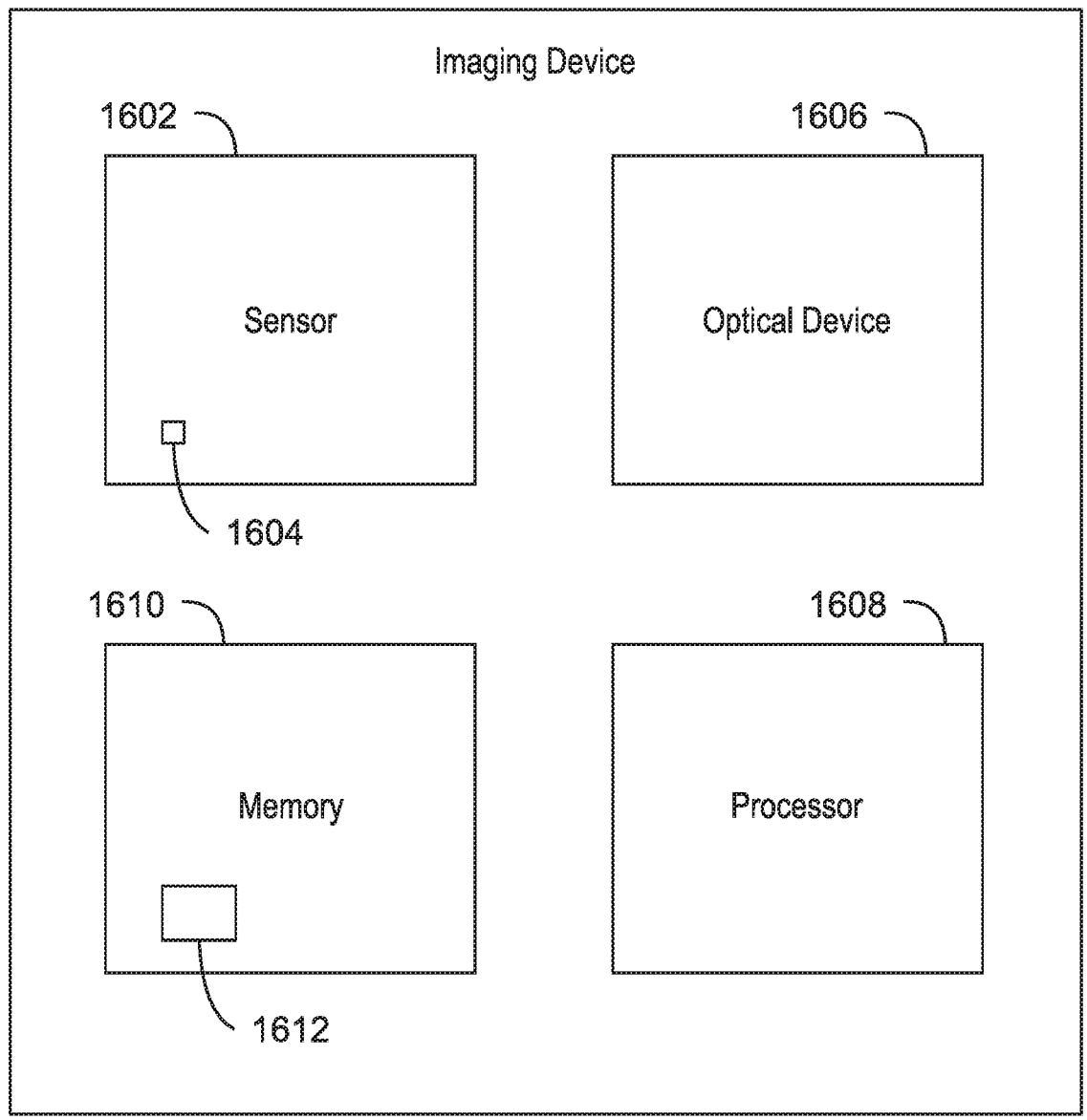
FIG. 16 is a diagram of a camera in accordance with embodiments of the present techniques.

FIG. 16 is an imaging device 1600 (e.g., camera) having an image sensor 1602. The image sensor 1602 may be a solid-state device which captures light to form a digital image. The image sensor 1602 has sensor elements 1604 which may be photosites, pixels, light sensitive element, etc. While the sensor elements 1604 may be labeled as pixels or raw pixels, the term pixel may also refer to the information pixels forming an image, as discussed.

The imaging device 1600 also has an optical system 1606 (e.g., aperture or lens aperture). Further, the imaging 1600 includes a processor 1608. The imaging device 1600 also has memory 1610 storing code 1612 (e.g., instructions, logic, etc.) executed by the processor 1608 to implement the refocusing techniques discussed herein.

Figure 17:
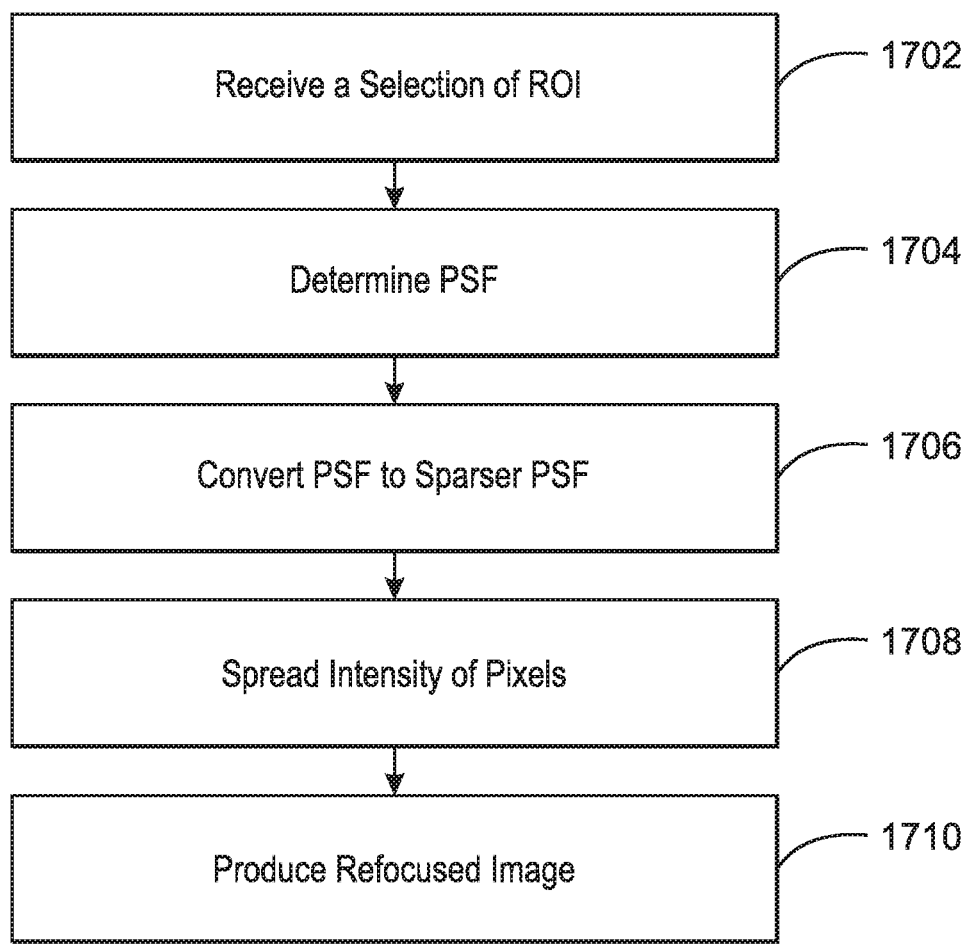
FIG. 17 is a block flow diagram of a method of refocusing in accordance with embodiments of the present techniques.

FIG. 17 is a method 1700 of refocusing an image captured by an imaging device such as by the imaging device 1600 of FIG. 16. The method 1700 may be implemented via the executed code 1612 and the processor 1608 of the imaging 1600, or via the executed code 1306 and the processor 1302 of the computing device 1300, and executed by other systems.

At block 1702, the method includes receiving a selection (e.g. by a user) of a region of interest (ROI) of the image. At block 1704, the method includes determining a PSF based on depth of pixels of the camera. In some embodiments, determining the PSF may be also according to a shape of an aperture of the camera. At least a portion of the aperture shape being continuous may be beneficial. At block 1706, the method includes converting the PSF to a gradient domain (e.g., multi-order) including differentiating the PSF to reduce nonzero elements in the PSF to give a sparser PSF (i.e., sparser in nonzero elements). The differentiating of the PSF may be by row of the PSF or by column of the PSF. For a multi-order differentiation, the differentiation may be by both row and column.

At block 1708, the method includes spreading intensity of pixels of the camera into a circle of confusion per the sparser PSF and the ROI. The spreading intensity of the pixels may involve applying respectively the sparser PSF to each pixel. Moreover, spreading intensity of pixels may incorporate a spread diameter correlative with distance between pixel depth and depth of refocusing. At block 1710, the method includes producing the image refocused to at least the ROI. To do so, the method may include integrating the spreading of the intensity of the pixels per the sparser PSF. In some examples, the differentiating and the integrating are performed in real time without image quality loss. Lastly, the produced image may be in focus in a region(s) sharing a depth of the ROI.

In the description and claims, the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit or receive signals, among others.

An embodiment is an implementation or example. Reference in the specification to "an embodiment", "one embodiment", "some embodiments", "various embodiments", or "other embodiments" means that a particular feature, structure, or characteristic described in connection with the embodiments is included in at least some embodiments, but not necessarily all embodiments, of the present techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can", or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement or order of circuit elements or other features illustrated in the drawings or described herein need not be arranged in the particular way illustrated and described. Many other arrangements are possible according to some embodiments.

In each system shown in a figure, the elements in some cases may each have a same reference number or a different reference number to suggest that the elements represented could be different or similar. However, an element may be flexible enough to have different implementations and work with some or all of the systems shown or described herein. The various elements shown in the figures may be the same or different. Which one is referred to as a first element and which is called a second element is arbitrary.

Examples are given. Example 1 is a method of refocusing an image captured by an imaging device. The method includes receiving a selection of a region of interest (ROI) of the image; determining an initial point spread function (PSF) based on depth of pixels of the image; converting the initial PSF to a gradient domain comprising differentiating the initial PSF to reduce nonzero elements to give a sparser PSF that is sparser in nonzero elements than the initial PSF; spreading intensity of pixels of the image into a circle of confusion per the sparser PSF and the ROI; and producing the image refocused to at least the ROI.

Example 2 includes the method of example 1, including or excluding optional features. In this example, spreading intensity of the pixels comprises applying respectively the sparser PSF to each pixel associated with the circle of confusion.

Example 3 includes the method of any one of examples 1 to 2, including or excluding optional features. In this example, the method includes integrating the spreading of the intensity of the pixels per the sparser PSF. Optionally, the differentiating and the integrating are performed in real time without image quality loss, and wherein the image as produced refocused is in focus in a region sharing a depth of the ROI, the region not comprising the ROI.

Example 4 includes the method of any one of examples 1 to 3, including or excluding optional features. In this example, the gradient domain is a multi-order gradient domain, and wherein differentiating is multi-order differentiation.

Example 5 includes the method of any one of examples 1 to 4, including or excluding optional features. In this example, differentiating the PSF comprises differentiating by row of the PSF or by column of the PSF, or a combination thereof.

Example 6 includes the method of any one of examples 1 to 5, including or excluding optional features. In this example, determining the initial PSF is according to a shape of an aperture of the imaging device, wherein the shape of the aperture is continuous in a direction of the differentiation, and wherein spreading intensity of pixels comprises a spread diameter correlative with distance between depth of a pixel and a depth of refocusing.

Example 7 is an imaging device. The device includes an image sensor; a processor; and memory storing code executable by the processor to direct the processor to: determine a point spread function (PSF) according to a region of interest (ROI); convert the PSF to a gradient domain comprising to differentiate the PSF to reduce nonzero elements in the PSF to give a sparser PSF; and spread intensity of pixels of the image into a circle of confusion per the sparser PSF, wherein the image is to be refocused to at least the ROI.

Example 8 includes the device of example 7, including or excluding optional features. In this example, the device includes an aperture, wherein a shape of the aperture comprises a continuous shape in direction of differentiation of the PSF.

Example 9 includes the device of any one of examples 7 to 8, including or excluding optional features. In this example, the imaging device comprises a camera.

Example 10 includes the device of any one of examples 7 to 9, including or excluding optional features. In this example, the PSF is a function of pixel position in the image, pixel depth, and aperture shape, and wherein to spread intensity of the pixels comprises to combine respective implementations of the sparser PSF to each pixel.

Example 11 includes the device of any one of examples 7 to 10, including or excluding optional features. In this example, the code executable by the processor to direct the processor to integrate the spread of the intensity of the pixels per the sparser PSF.

Example 12 includes the device of any one of examples 7 to 11, including or excluding optional features. In this example, the gradient domain is a multi-order gradient domain, and wherein to differentiate comprises multi-order differentiation.

Example 13 is a tangible, non-transitory, computer-readable medium. The computer-readable medium includes instructions that direct the processor to receive a selection of a region of interest (ROI) of the image; determine a point spread function (PSF) according to pixel depth, the ROI, and a shape associated with an optical system of the imaging device; convert the PSF to a gradient domain comprising to differentiate the PSF to reduce nonzero elements in the PSF; and spread intensity of pixels of the image into a circle of confusion per the differentiated PSF, wherein the image to be refocused to at least the ROI; and produce the image refocused to the ROI.

Example 14 includes the computer-readable medium of example 13, including or excluding optional features. In this example, the gradient domain is a multi-order gradient domain, and wherein to differentiate comprises multi-order differentiation.

Example 15 includes the computer-readable medium of any one of examples 13 to 14, including or excluding optional features. In this example, to spread intensity of the pixels comprises to combine respective implementations to each pixel of the sparser PSF. Optionally, the code executable by the processor to direct the processor to integrate the spread of the intensity of the pixels per the differentiated PSF.

Example 16 includes the computer-readable medium of any one of examples 13 to 15, including or excluding optional features. In this example, the imaging device comprises a camera, and wherein the optical system comprises an aperture. Optionally, the optical system comprises a lens and the aperture comprises a lens aperture.

Example 17 includes the computer-readable medium of any one of examples 13 to 16, including or excluding optional features. In this example, differentiating the PSF comprises differentiating by row of the PSF or by column of the PSF, or a combination thereof.

Example 18 is a method of refocusing an image captured by camera. The method includes receiving a selection of a region of interest (ROI) of the image; determining a point spread function (PSF); converting the PSF to a gradient domain comprising differentiating the PSF to reduce nonzero elements; spreading intensity of pixels of the image into a circle of confusion per the differentiated PSF and the ROI, and according to a shape of an aperture of the camera; and producing the image refocused to at least the ROI.

Example 19 includes the method of example 18, including or excluding optional features. In this example, the method includes integrating the spreading of the intensity of the pixels to produce the image refocused to at least the ROI.

Example 20 includes the method of any one of examples 18 to 19, including or excluding optional features. In this example, the gradient domain is a multi-order gradient domain, and wherein differentiating is multi-order differentiation.

Example 21 includes the method of any one of examples 18 to 20, including or excluding optional features. In this example, a shape of the aperture comprises a continuous shape with respect to the differentiation.

Example 22 includes the method of any one of examples 18 to 21, including or excluding optional features. In this example, spreading intensity of the pixels comprises a combination of the differentiated PSF applied respectively to each pixel.

Example 23 is a method of refocusing an image captured by an imaging device. The method includes receiving a selection of a region of interest (ROI) of the image; determining an initial point spread function (PSF) based on depth of pixels of the image; converting the initial PSF to a gradient domain comprising differentiating the initial PSF to reduce nonzero elements to give a sparser PSF that is sparser in nonzero elements than the initial PSF; spreading intensity of pixels of the image into a circle of confusion per the sparser PSF and the ROI, wherein spreading intensity of the pixels comprises applying respectively the sparser PSF to each pixel associated with the circle of confusion; and producing the image refocused to at least the ROI.

Example 24 includes the method of example 23, including or excluding optional features. In this example, the method includes integrating the spreading of the intensity of the pixels per the sparser PSF.

Example 25 includes the method of any one of examples 23 to 24, including or excluding optional features. In this example, the gradient domain is a multi-order gradient domain, and wherein differentiating is multi-order differentiation.

Example 26 includes the method of any one of examples 23 to 25, including or excluding optional features. In this example, differentiating the PSF comprises differentiating by row of the PSF or by column of the PSF, or a combination thereof.

Example 27 includes the method of any one of examples 23 to 26, including or excluding optional features. In this example, determining the initial PSF is according to a shape of an aperture of the imaging device, and wherein the shape of the aperture comprises a continuous shape with respect to the differentiation.

Example 28 includes the method of any one of examples 23 to 27, including or excluding optional features. In this example, the image as produced refocused is in focus in a region sharing a depth of the ROI, the region not comprising the ROI.

Example 29 is an imaging device comprising an image sensor; a processor; and memory storing code executable by the processor to direct the processor to: determine a point spread function (PSF) according to a region of interest (ROI); differentiate the PSF in a gradient domain to give a differentiated PSF to reduce nonzero elements; and spread intensity of pixels of the image into a circle of confusion per the differentiated PSF, wherein the image is to be refocused to at least the ROI.

Example 30 includes the device of example 29, including or excluding optional features. In this example, the device includes an aperture, wherein a shape of the aperture comprises a continuous shape in direction of differentiation of the PSF.

Example 31 includes the device of any one of examples 29 to 30, including or excluding optional features. In this example, the PSF is a function of pixel position in the image, pixel depth, and aperture shape, and wherein to spread intensity of the pixels comprises to combine respective implementations of the differentiated PSF to each pixel.

Example 32 includes the device of any one of examples 29 to 31, including or excluding optional features. In this example, the code executable by the processor to direct the processor to integrate the spread of the intensity of the pixels per the differentiated PSF, wherein the gradient domain is a multi-order gradient domain, and wherein to differentiate comprises multi-order differentiation.

Example 33 is a tangible, non-transitory, computer-readable medium. The computer-readable medium includes instructions that direct the processor to receive a selection of a region of interest (ROI) of an image captured by an imaging device; determine a point spread function (PSF) according to pixel depth, the ROI, and a shape associated with an optical system of the imaging device; convert the PSF to a gradient domain comprising to differentiate the PSF to reduce nonzero elements in the PSF; and spread intensity of pixels of the image into a circle of confusion per the differentiated PSF, wherein to spread intensity of pixels comprises a spread diameter correlative with distance between depth of a pixel and a depth of refocusing, and wherein the image to be refocused to at least the ROI; and produce the image refocused to the ROI.

Example 34 includes the computer-readable medium of example 33, including or excluding optional features. In this example, the gradient domain is a multi-order gradient domain, and wherein to differentiate comprises multi-order differentiation.

Example 35 includes the computer-readable medium of any one of examples 33 to 34, including or excluding optional features. In this example, to spread intensity of the pixels comprises to combine respective implementations to each pixel of the sparser PSF.

Example 36 includes the computer-readable medium of any one of examples 33 to 35, including or excluding optional features. In this example, the code executable by the processor to direct the processor to integrate the spread of the intensity of the pixels per the differentiated PSF.

Example 37 includes the computer-readable medium of any one of examples 33 to 36, including or excluding optional features. In this example, the imaging device comprises a camera, and wherein the optical system comprises an aperture.

Example 38 is a system for refocusing an image captured by an imaging device. The system includes means for receiving a selection of a region of interest (ROI) of the image; means for determining an initial point spread function (PSF) based on depth of pixels of the image; means for differentiating the initial PSF to a gradient domain to reduce nonzero elements to give a sparser PSF that is sparser in nonzero elements than the initial PSF; means for spreading intensity of pixels of the image into a circle of confusion per the sparser PSF and the ROI; and means for producing the image refocused to at least the ROI.

Example 39 includes the system of example 38, including or excluding optional features. In this example, means for spreading intensity of the pixels comprises means for applying respectively the sparser PSF to each pixel associated with the circle of confusion.

Example 40 includes the system of any one of examples 38 to 39, including or excluding optional features. In this example, the system includes means for integrating the spreading of the intensity of the pixels per the sparser PSF. Optionally, the image as produced refocused is in focus in a region sharing a depth of the ROI, the region not comprising the ROI.

Example 41 includes the system of any one of examples 38 to 40, including or excluding optional features. In this example, the gradient domain is a multi-order gradient domain giving multi-order differentiation.

Example 42 includes the system of any one of examples 38 to 41, including or excluding optional features. In this example, the means for differentiating the PSF comprises means for differentiating by row of the PSF or by column of the PSF, or a combination thereof.

Example 43 includes the system of any one of examples 38 to 42, including or excluding optional features. In this example, the initial PSF is according to a shape of an aperture of the imaging device.

Example 44 includes the system of any one of examples 38 to 43, including or excluding optional features. In this example, the shape of the aperture is continuous with respect to the differentiating.

Example 45 includes the system of any one of examples 38 to 44, including or excluding optional features. In this example, the means for spreading intensity of pixels accounts for a spread diameter correlative with distance between depth of a pixel and a depth of refocusing.

Example 46 includes the system of any one of examples 38 to 45, including or excluding optional features. In this example, the system comprises the imaging device.

Example 47 is a system for refocusing an image captured by camera. The system includes means for receiving a selection of a region of interest (ROI) of the image; means for determining a point spread function (PSF); means for converting the PSF to a gradient domain comprising differentiating the PSF to give a differentiated PSF to reduce nonzero elements; and means for spreading intensity of pixels of the image into a circle of confusion per the differentiated PSF and the ROI, and according to a shape of an aperture of the camera; and means for producing the image refocused to at least the ROI.

Example 48 includes the system of example 47, including or excluding optional features. In this example, the system includes means for integrating the spreading of the intensity of the pixels to produce the image refocused to at least the ROI.

Example 49 includes the system of any one of examples 47 to 48, including or excluding optional features. In this example, the gradient domain is a multi-order gradient domain, and wherein differentiating is multi-order differentiation.

Example 50 includes the system of any one of examples 47 to 49, including or excluding optional features. In this example, a shape of the aperture is continuous with respect to differentiation of the PSF Example 51 includes the system of any one of examples 47 to 50, including or excluding optional features. In this example, the means for spreading intensity of the pixels to implement a combination of the differentiated PSF applied respectively to each pixel.

Example 52 is an imaging device to capture an image. The imaging device includes an imaging sensor and a processor. The imaging device has memory storing code executable by the processor to direct the processor to: determine a point spread function (PSF) according to a region of interest (ROI) of the image and based on depths of pixels in the image; convert the PSF to a gradient domain comprising to differentiate the PSF to give a differentiated PSF to reduce occurrence of nonzero elements; and spread intensity of pixels of the image into a circle of confusion per the differentiated PSF, wherein the image to be refocused to a depth of the ROI.

Example 53 includes the imaging device of example 52, including or excluding optional features. In this example, the imaging device comprises a camera.

Example 54 includes the imaging device of any one of examples 52 to 53, including or excluding optional features. In this example, the imaging device includes an aperture. Optionally, a shape of the aperture comprises a continuous shape in direction of differentiation of the PSF.

Example 55 includes the imaging device of any one of examples 52 to 54, including or excluding optional features. In this example, the PSF is a function of pixel position in the image, pixel depth, and aperture shape.

Example 56 includes the imaging device of any one of examples 52 to 55, including or excluding optional features. In this example, to spread intensity of the pixels comprises to combine respective implementations of the differentiated PSF to each pixel associated with the circle of confusion.

Example 57 includes the imaging device of any one of examples 52 to 56, including or excluding optional features. In this example, the code executable by the processor to direct the processor to integrate the spread of the intensity of the pixels per the differentiated PSF.

Example 58 includes the imaging device of any one of examples 52 to 57, including or excluding optional features. In this example, the gradient domain is a multi-order gradient domain, and wherein to differentiate comprises multi-order differentiation.

Example 59 includes the imaging device of any one of examples 52 to 58, including or excluding optional features. In this example, the image as produced refocused is in focus in a region sharing a depth of the ROI, the region not comprising the ROI.

Example 60 includes the imaging device of any one of examples 52 to 59, including or excluding optional features. In this example, the image to be refocused to both a first depth and a second depth, the first depth comprising the depth of the ROI and the second depth different than the first depth.

Example 61 is a computing system to refocus an image captured by an imaging system. The computing system has a processor and memory storing code executable by the processor to direct the processor to: determine a point spread function (PSF) according to a region of interest (ROI) of the image and based on depths of pixels in the image; convert the PSF to a gradient domain comprising to differentiate the PSF to give a differentiated PSF to reduce presence of nonzero elements; and spread intensity of pixels of the image into a circle of confusion per the differentiated PSF, wherein the image to be refocused to at least a depth of the ROI.

Example 62 includes the computing system of example 61, including or excluding optional features. In this example, the imaging system comprises a camera.

Example 63 includes the computing system of any one of examples 61 to 62, including or excluding optional features. In this example, the imaging system comprises an aperture and an image sensor. Optionally, a shape of the aperture comprises a continuous shape in direction of differentiation of the PSF.

Example 64 includes the computing system of any one of examples 61 to 63, including or excluding optional features. In this example, the PSF is a function of pixel position in the image, pixel depth, and aperture shape.

Example 65 includes the computing system of any one of examples 61 to 64, including or excluding optional features. In this example, to spread intensity of the pixels comprises to combine respective implementations of the differentiated PSF to each pixel associated with the circle of confusion.

Example 66 includes the computing system of any one of examples 61 to 65, including or excluding optional features. In this example, the code executable by the processor to direct the processor to integrate the spread of the intensity of the pixels per the differentiated PSF.

Example 67 includes the computing system of any one of examples 61 to 66, including or excluding optional features. In this example, the gradient domain is a multi-order gradient domain, and wherein to differentiate comprises multi-order differentiation.

Example 68 includes the computing system of any one of examples 61 to 67, including or excluding optional features. In this example, the image as produced refocused is in focus in a region sharing a depth of the ROI, the region not comprising the ROI.

Example 69 includes the computing system of any one of examples 61 to 68, including or excluding optional features. In this example, the image to be refocused to both a first depth and a second depth, the first depth comprising the depth of the ROI and the second depth different than the first depth.

It is to be understood that specifics in the aforementioned examples may be used anywhere in one or more embodiments. For instance, all optional features of the computing device described above may also be implemented with respect to either of the methods described herein or a computer-readable medium. Furthermore, although flow diagrams or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method of refocusing an image captured by an imaging device, comprising:
    obtaining a selection of a region of interest (ROI) of the image;
    determining an initial point spread function (PSF) based on depth information associated with pixels of the image;
    converting the initial PSF to a gradient domain by differentiating the initial PSF to generate a sparser PSF, the sparser PSF is sparser in nonzero elements than the initial PSF;
    spreading intensity of the pixels of the image into a circle of confusion per the sparser PSF and the ROI; and
    producing the image refocused to at least the ROI.

2. The method of claim 1, wherein the spreading of the intensity of the pixels includes applying the sparser PSF respectively to different ones of the pixels associated with the circle of confusion.

3. The method of claim 1, further including integrating the spreading of the intensity of the pixels per the sparser PSF.

4. The method of claim 3, wherein the differentiating and the integrating are performed in real time without image quality loss, and the refocused image is in focus in a region sharing a depth with the ROI, the region not including the ROI.

5. The method of claim 1, wherein the gradient domain is a multi-order gradient domain, and the differentiating includes multi-order differentiation.

6. The method of claim 1, wherein the differentiating of the initial PSF includes differentiating by row of the initial PSF or by column of the initial PSF, or a combination thereof.

7. The method of claim 1, wherein the determining of the initial PSF is according to a shape of an aperture of the imaging device, the shape of the aperture is continuous in a direction of differentiation, and the spreading of the intensity of the pixels is associated with a spread diameter corresponding to a distance between a depth of a pixel and a depth of refocusing.

8. An imaging device comprising:
    an image sensor;
    memory;
    instructions; and
    a processor to execute the instructions to:
        determine a point spread function (PSF) according to a region of interest (ROI) of an image;
        convert the PSF to a gradient domain by differentiating the PSF to reduce nonzero elements in the PSF to give a sparser PSF; and
        spread intensity of pixels of the image into a circle of confusion per the sparser PSF, the image to be refocused to at least the ROI.

9. The imaging device of claim 8, further including an aperture, a shape of the aperture includes a continuous shape in a direction of differentiation of the PSF.

10. The imaging device of claim 8, wherein the imaging device includes a camera.

11. The imaging device of claim 8, wherein the PSF is a function of pixel position in the image, depth associated with the pixels in the image, and aperture shape, and the processor is to spread the intensity of the pixels by combining respective implementations of the sparser PSF applied to different ones of the pixels in the image.

12. The imaging device of claim 8, wherein the processor is to integrate the spread of the intensity of the pixels per the sparser PSF.

13. The imaging device of claim 8, wherein the gradient domain is a multi-order gradient domain, and the processor is to differentiate by multi-order differentiation.

14. A tangible, computer-readable storage disk comprising instructions that, when executed, cause a processor to:
    determine a point spread function (PSF) according to depth information for pixels of an image, a selection of a region of interest (ROI) of the image, and a shape associated with an optical system of an imaging device that captured the image;
    convert the PSF to a gradient domain by differentiating the PSF to reduce nonzero elements in the PSF;
    spread intensity of the pixels of the image into a circle of confusion per the differentiated PSF; and
    produce the image refocused to the ROI.

15. The tangible computer-readable storage disk of claim 14, wherein the gradient domain is a multi-order gradient domain, and the differentiating of the PSF includes multi-order differentiation.

16. The tangible computer-readable storage disk of claim 14, wherein the spreading of the intensity of the pixels includes combining results of applying the differentiated PSF to respective ones of the pixels.

17. The tangible computer-readable storage disk of claim 16, wherein the instructions further cause the processor to integrate the spread of the intensity of the pixels per the differentiated PSF.

18. The tangible computer-readable storage disk of claim 14, wherein the imaging device includes a camera, and the optical system includes an aperture, and the differentiating of the PSF includes differentiating by row of the PSF or by column of the PSF, or a combination thereof.

19. The tangible computer-readable storage disk of claim 18, wherein the optical system includes a lens and the aperture includes a lens aperture, and the differentiating of the PSF includes differentiating by row of the PSF or by column of the PSF, or a combination thereof.

20. The tangible computer-readable storage disk of claim 14, wherein the differentiating of the PSF includes differentiating by row of the PSF or by column of the PSF, or a combination thereof.

21. A method of refocusing an image captured by a camera, comprising:
    obtaining a selection of a region of interest (ROI) of the image; determining a point spread function (PSF);
    converting the PSF to a gradient domain, the converting including differentiating the PSF to reduce nonzero elements;

spreading intensity of pixels of the image into a circle of confusion per the differentiated PSF and the ROI, and according to a shape of an aperture of the camera; and producing the image refocused to at least the ROI.

22. The method of claim 21, further including integrating the spreading of the intensity of the pixels to produce the image refocused to at least the ROI.

23. The method of claim 21, wherein the gradient domain is a multi-order gradient domain, and wherein the differentiating includes multi-order d ifferentiation.

24. The method of claim 21, wherein the shape of the aperture includes a continuous shape with respect to the differentiation.

25. The method of claim 21, wherein the spreading of the intensity of the pixels includes a combination of the differentiated PSF applied respectively different ones of the pixels.

* * * * *